（12）United States Patent
Russ

(10) Patent No.: US 7,234,008 B1
(45) Date of Patent: Jun. 19, 2007

(54) METHOD AND SYSTEM FOR EXCHANGING DATA BETWEEN A CENTRAL PROCESSING UNIT AND AN INPUT/OUTPUT PROCESSOR

(75) Inventor: Craig F. Russ, Berwyn, PA (US)

(73) Assignee: Unisys Corporation, Blue Bell, PA (US)

( * ) Notice: Subject to any disclaimer, the term of this patent is extended or adjusted under 35 U.S.C. 154(b) by 442 days.

(21) Appl. No.: 10/858,776

(22) Filed: Jun. 2, 2004

(51) Int. Cl.
*G06F 12/00* (2006.01)
*G06F 13/00* (2006.01)

(52) U.S. Cl. .......................... 710/52; 710/56; 711/170; 711/171; 713/1

(58) Field of Classification Search ................. 710/52, 710/56; 711/171, 170; 713/1
See application file for complete search history.

(56) References Cited

U.S. PATENT DOCUMENTS 6,070,202 A * 5/2000 Minkoff et al. ............... 710/56

7,093,097 B2 * 8/2006 Herr et al. .................. 711/171
7,143,263 B2 * 11/2006 Anand et al. ............... 711/171

\* cited by examiner

*Primary Examiner*—Tammara Peyton
(74) *Attorney, Agent, or Firm*—Richard J. Gregson; Volpe and Koenig

(57) ABSTRACT

A method is disclosed for exchanging data between a central processing unit (CPU) and an input/output processor (IOP). The CPU and IOP may both be senders or receivers depending on whether data is flowing to or from the CPU. Where data is flowing to the CPU, the CPU is the receiver and the IOP is the sender. Where data is flowing from the CPU, the CPU is the sender and the IOP is the receiver. A sender evaluates the amount of empty buffers and, in a preferred embodiment, whether there is more data coming to determine whether to release partially full buffers in its buffer pool. Partially full buffers may be released based on any threshold as desired from a simple integer to a complex algorithm. The evaluation of whether to release partially full buffers is preferably implemented where a sender obtains at least one data packet for sending to a receiver and where a sender obtains an empty buffer from a receiver.

10 Claims, 7 Drawing Sheets

METHOD AND SYSTEM FOR EXCHANGING DATA BETWEEN A CENTRAL PROCESSING UNIT AND AN INPUT/OUTPUT PROCESSOR

FIELD OF INVENTION

The present invention relates to mainframe computing environments wherein input/output processing is offloaded from a central processing unit (CPU) to an input/output processor (IOP). More particularly, the present invention relates to exchanging data between a CPU and an IOP.

BACKGROUND

Referring initially to FIG. 1, it is typical in a mainframe-computer/server (hereinafter "mainframe") environment for a system 10 to include a mainframe 12 having at least one central processing unit (CPU) 14 wherein an input/output processor (IOP) 16 is also provided so that input/output processing is offloaded from the CPU 14 to the IOP 16. In such arrangements, the IOP 16 will obtain data from some source such as a local area network (LAN) 18 and send the data to the CPU 14 for delivery to software programs, as appropriate. In this situation, the IOP 16 is referred to as the sender and the CPU 14 is referred to as the receiver. Similarly, once the data has been processed, the CPU 14 will obtain data from the software programs and send the data to the IOP 16 for delivery to the LAN 18. In this situation, the CPU 14 is referred to as the sender and the IOP 16 is referred to as the receiver. In both situations, data obtained by the sender is stored prior to being sent in a plurality of buffers which typically reside in a memory 20 wherein both the CPU 14 and IOP 16 have read/write access.

Referring now to FIG. 2, the basic flow of data in a system 10 as shown in FIG. 1, is that data is placed in a current buffer (i.e. the buffer to be or being filled) by a sender 204 of data and once the buffer is full, the buffer is released by the sender 204 of data to a receiver 206 of data via some queuing or messaging protocol. The receiver 206 then extracts the data and the now empty buffer is released back to the sender 204, again via some queuing or messaging protocol.

The efficiency with which data is exchanged between a sender and receiver is impacted by a number of factors. For example, where a CPU is a receiver, the CPU is a factor in that where a CPU is slow in processing data, it is therefore slow in returning empty buffers. This may result in a lack of empty buffers for a sender (in this case an IOP) causing the sender to delay sending data until an empty buffer is returned by a receiver. The efficiency of data exchange is also impacted by the manner in which a sender sends data to a receiver. That is, when a sender has at least one empty buffer available, it may send a piece of data (e.g. an Internet Protocol (IP) packet) as soon as the sender obtains the packet. However, this is very inefficient because the operation of sending data between a sender and receiver is fairly expensive in terms of the number of processor cycles required. It is therefore preferable to send a plurality of data packets at one time. In this situation, however, systems are typically configured wherein a sender releases buffers to a receiver once the buffers are full. Additionally, some type of time limit is typically used to control the release of partially full buffers after a predetermined time period.

The use of time limits, however, has disadvantages in that they cause inefficiencies regardless of the duration of the time limit that is used. For example, the longer the time limit, the greater the degradation in performance of transaction based protocols where an approximately equal number of packets are traveling in both directions and are preferably exchanged as fast as possible. Conversely, the shorter the time limit, the greater the degradation in performance of streaming protocols wherein large quantities of data packets are sent in a single direction and are preferably exchanged in the largest quantity possible.

It would therefore be desirable to provide a method for exchanging data between a CPU and an IOP that works equally well for transaction based protocols and streaming protocols wherein a sender determines when to release partially full buffers to a receiver.

SUMMARY

The present invention is a method and system for exchanging data between a central processing unit (CPU) and an input/output processor (IOP). The CPU and IOP may both be senders or receivers depending on whether data is flowing to or from the CPU. Where data is flowing to the CPU, the CPU is the receiver and the IOP is the sender. Where data is flowing from the CPU, the CPU is the sender and the IOP is the receiver.

A sender evaluates the amount of empty buffers and, in a preferred embodiment, whether there is more data coming to determine whether to release partially full buffers in its buffer pool. Partially full buffers may be released based on any threshold as desired from a simple integer to a complex algorithm. The evaluation of whether to release partially full buffers is preferably implemented where a sender obtains at least one data packet for sending to a receiver and where a sender obtains an empty buffer from a receiver.

BRIEF DESCRIPTION OF THE DRAWING(S)

DETAILED DESCRIPTION OF THE PREFERRED EMBODIMENT(S)

Figure 1:
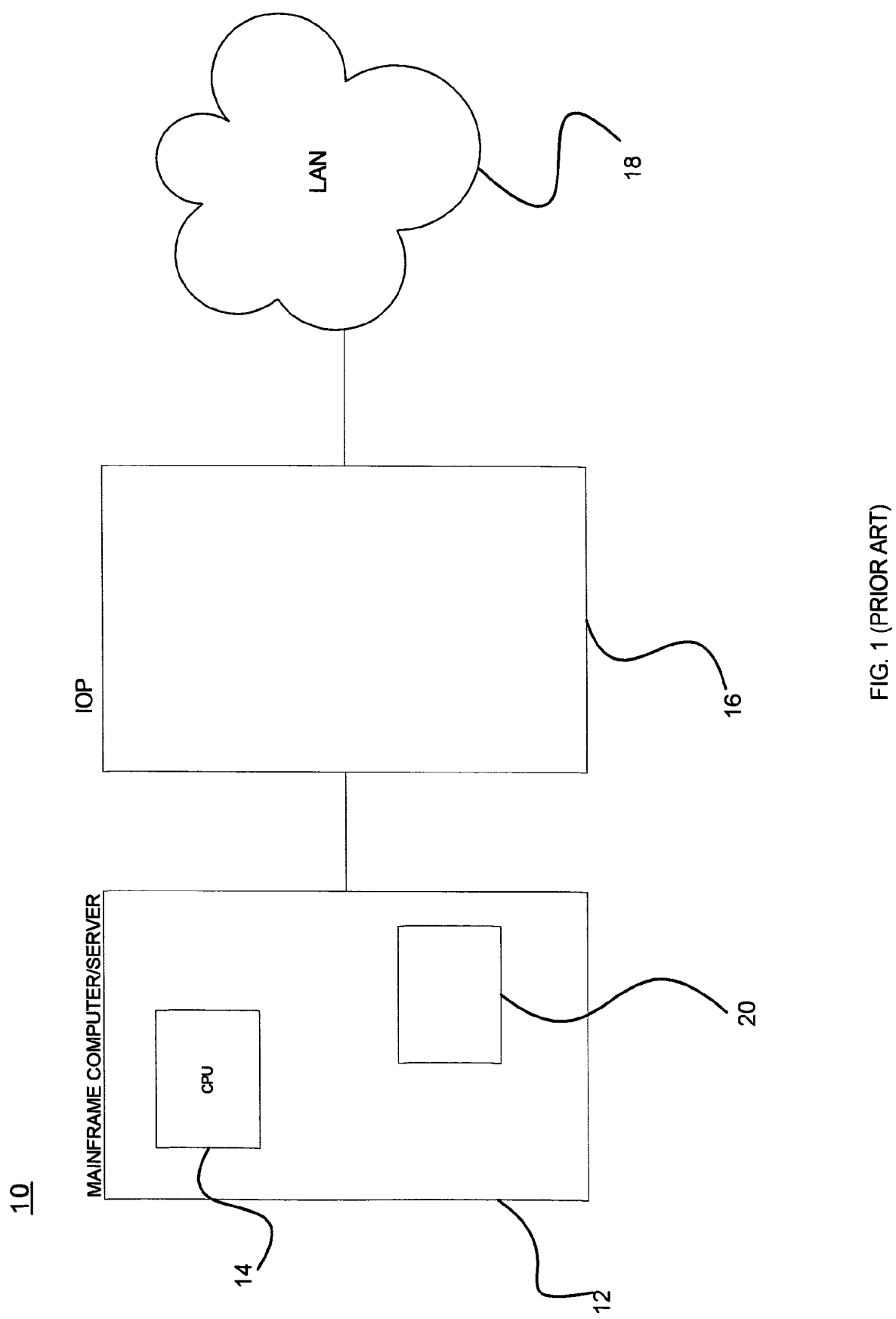
FIG. 1 is a block diagram of a conventional mainframe environment wherein an input/output processor (IOP) is provided to offload input/output processing from a central processing unit (CPU) of a mainframe computer.
Figure 2:
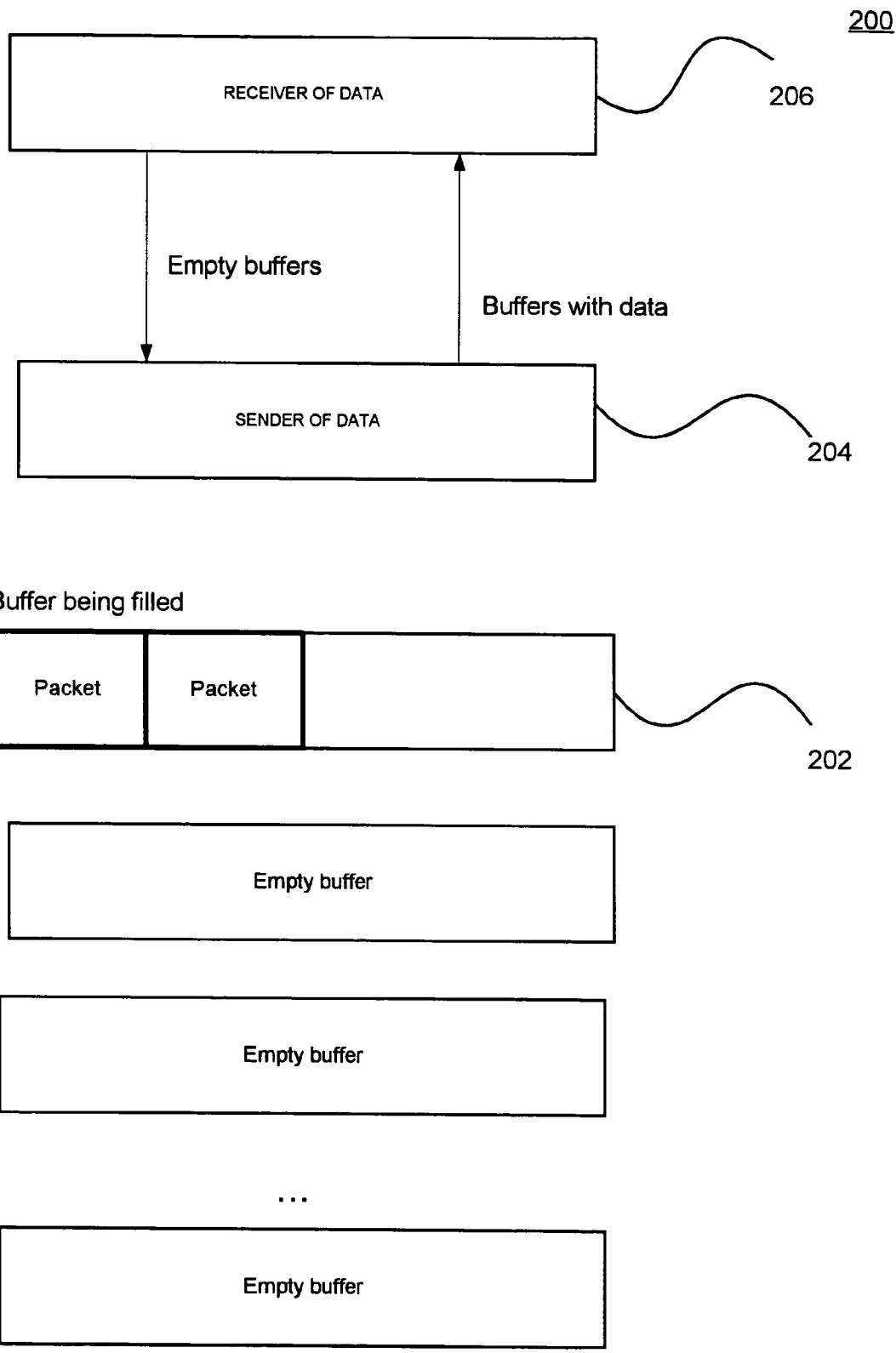
FIG. 2 is a block diagram generally of the flow of data between a CPU and IOP in conventional mainframe environments.
Figure 3:
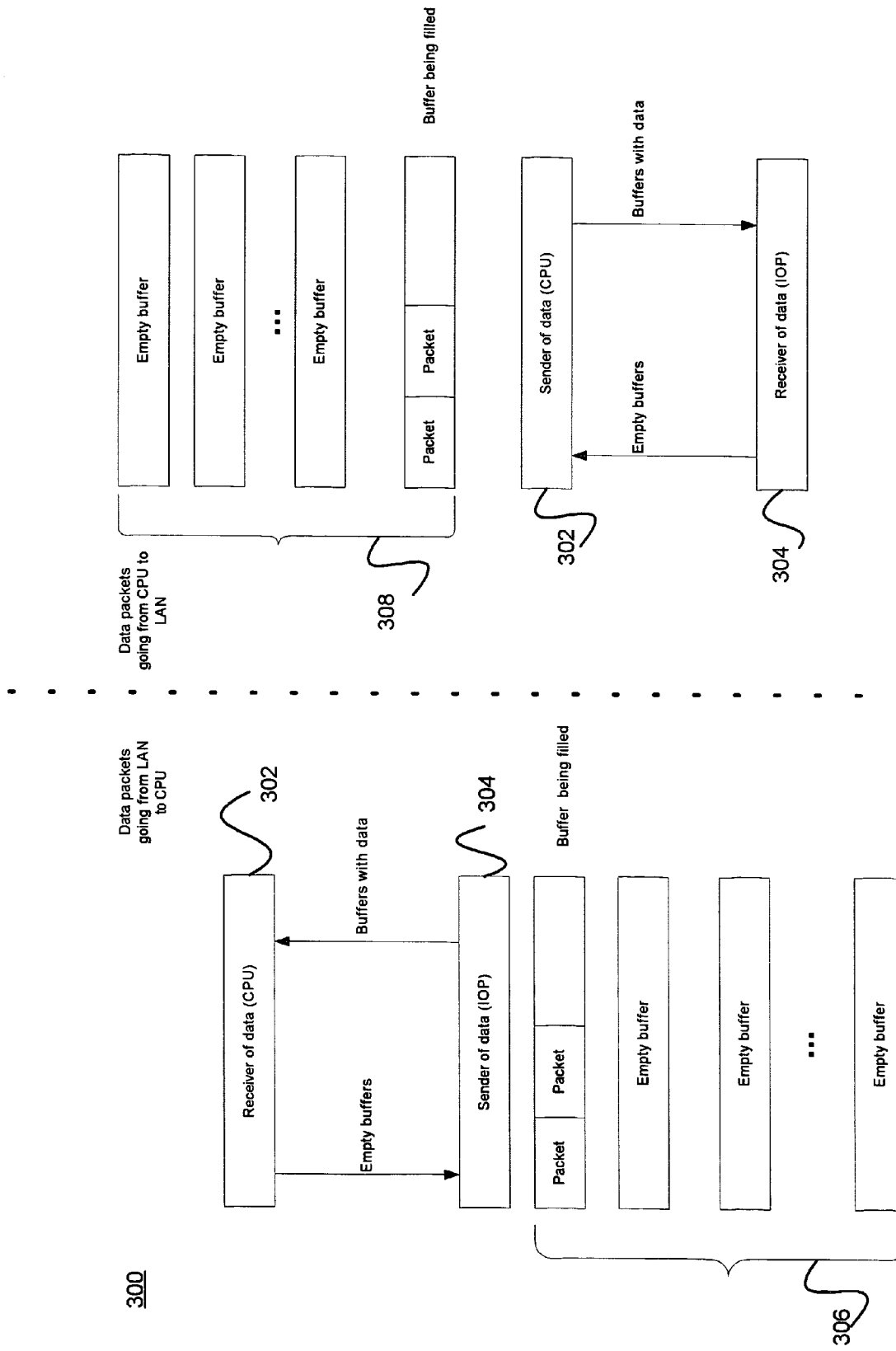
FIG. 3 is a block diagram of a preferred embodiment of the present invention wherein data is exchanged between a CPU and an IOP.

Referring now to FIG. 3, there is shown block diagram of a preferred embodiment of the present invention wherein data is exchanged between a CPU 302 and an IOP 304 in system 300. As mentioned, the CPU 302 and IOP 304 can both be either a sender of data or a receiver of data. Therefore, for purposes of explaining the present invention, the diagram is divided in the middle, and has a left hand side and a right hand side. On the left hand side, the IOP 304 is the sender of data and the CPU 302 is the receiver of data. On the right hand side, the CPU 302 is the sender of data and the IOP 304 is the receiver of data.

As mentioned above, the IOP 304 obtains data packets from some type of source such as, for example, a local area network (LAN) and sends them to the CPU 302 for processing. In this case, the IOP 304 is the sender and the CPU 302 is the receiver as shown on the left hand side of FIG. 3. The CPU 302 forwards data packets received from the IOP 304 to the appropriate software programs for processing, as appropriate. Once the processing is complete, data packets are sent back to the LAN. In this case the CPU 302 is the sender and the IOP 304 is the receiver as shown on the right hand side of FIG. 3. To exchange data between senders and receivers, buffers are released back and forth. For example, referring to the left hand side of the diagram, a sender (in this case IOP 304) obtains packets, places them in buffers, and releases buffers having data therein to the receiver (in this case CPU 302). The receiver extracts the data packets and releases empty buffers back to the sender, and the sender adds them to its buffer pool.

Generally, the present invention, in its simplest form, releases partially full buffers based on the number of empty buffers in a sender's buffer pool 306, 308. That is, in an embodiment of the present invention, partially full buffers may be released by a sender to a receiver whenever the number of empty buffers in a sender's buffer pool exceeds some type of predetermined threshold. Accordingly, it is preferable to provide both the CPU 302 and IOP 304 with their own buffer pool 308, 306, respectively. The buffer pools are preferably any fixed number of buffers wherein the buffers may be of any size, as desired. The buffers are preferably located in a memory wherein the CPU 302 and IOP 304 have read/write access.

There are preferably two triggering points at which a sender will evaluate whether to release a partially full buffer in its buffer pool. The first triggering point is where a sender adds a data packet to a buffer. That is, whenever a sender adds a data packet to its current buffer (i.e. the buffer to be or being filled by the sender), the sender compares the number of empty buffers in its buffer pool versus some threshold. In this situation, the current buffer is by definition partially full because the sender is adding a packet to it. Therefore, if the number of empty buffers exceeds the threshold (i.e. the receiver is keeping up with the sender by releasing a satisfactory amount of buffers), the sender releases the current buffer. This triggering point is described in more detail in the descriptions of FIGS. 4 and 6.

The second triggering point is where a sender adds an empty buffer to its buffer pool. That is, whenever a receiver releases an empty buffer back to the sender and the sender adds the buffer to its buffer pool, the sender determines whether the number of empty buffers exceeds the threshold. In this situation, however, there may or may not be a partially full buffer to release. Therefore, in this embodiment, partially full buffers are released once the sender has confirmed not only that the threshold is exceeded, but also that there is in fact a partially full buffer to release. This triggering point is described in more detail in the descriptions of FIGS. 5 and 7.

By utilizing the present invention at the triggering points described above, data packets are sent to a receiver as fast as they arrive so long as the receiver is able to keep up. When the receiver is not able to keep up, multiple packets are placed in each buffer. Therefore, the number of data packets placed in a buffer is inversely related to how well the receiver is keeping up with the sender, (i.e. how many empty buffers are present in the sender's buffer pool). Of course, a time limit may also be utilized in the present invention as explained in more detail below.

Figure 4:
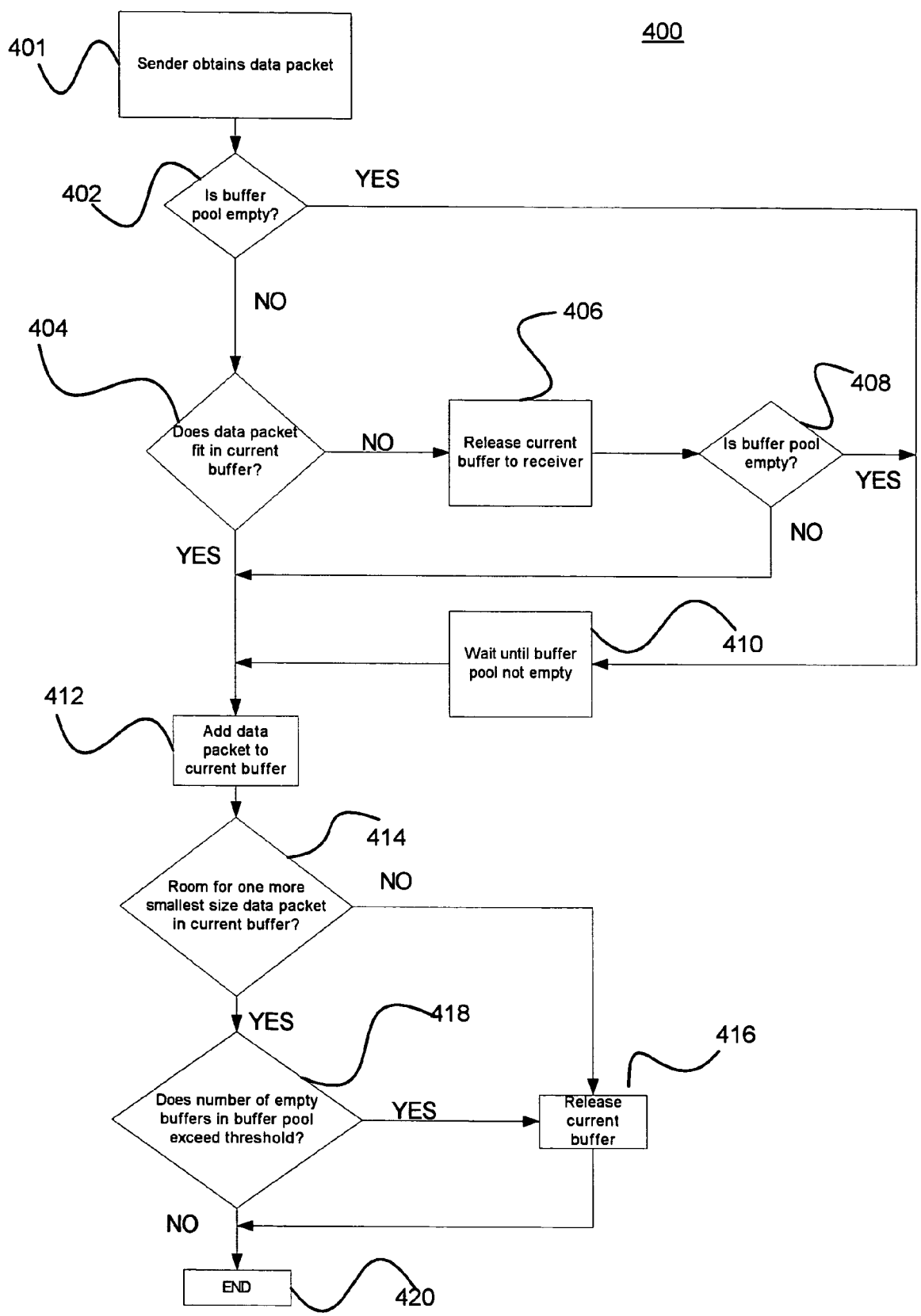
FIG. 4 is a flow diagram of a method wherein a sender of data evaluates whether to release a buffer to a receiver of the data when the sender is adding a data packet to the buffer in accordance with a preferred embodiment of the present invention.

Referring now to FIG. 4, a flow diagram is shown of a method 400 wherein a sender of data evaluates whether to release a buffer to a receiver of the data when the sender is adding a data packet to the buffer, in accordance with a preferred embodiment of the present invention. The method 400 is preferably implemented by a sender each time the sender adds a data packet to its current buffer. Therefore, method 400 preferably begins in step 401 wherein a sender obtains a data packet. As previously explained, where the sender is a CPU, the data packet is obtained from a source such as a software program and where the sender is an IOP, the data packet is obtained from a source such as a LAN. Next, in step 402 the sender determines whether its buffer pool is empty. If the sender's buffer pool is not empty, the sender checks whether the data packet fits in the current buffer (i.e. the buffer to be or being filled by the sender) in step 404. If the data packet does not fit in the current buffer, the sender releases the current buffer to the receiver in step 406. Once the current buffer is released in step 406, the sender checks whether the buffer pool is now empty (step 408) as a result of releasing the buffer which previously was the current buffer. If in step 408 the buffer pool is not empty, the method 400 proceeds to step 412 wherein the data packet is added to the next buffer in line which is now the current buffer. If in step 408 the buffer pool is empty, the sender waits until the buffer pool is not empty (i.e. a buffer is released back from a receiver to the sender) in step 410 and then the sender adds the data packet to the current buffer in step 412.

Referring again to step 402, if the buffer pool is empty, the sender waits (step 410) until the buffer pool is not empty and then adds the data packet to the current buffer in step 412. Referring again to step 404, if the data packet does fit in the current buffer, the method 400 proceeds directly to step 412 where the data packet is added to the current buffer.

Once the data packet has been added to the current buffer in step 412, the method 400 proceeds to step 414. In step 414, the sender determines whether there is room for one more smallest-size data packet in the current buffer. This determination may be performed as desired based on the smallest data packets exchanged in the system and the buffer size, both of which are known to a CPU and IOP. If the current buffer cannot hold one more smallest-size packet in the current buffer, the current buffer is released in step 416 and the method 400 ends in step 420. If there is room for one more smallest-size data packet in the current buffer, the sender determines in step 418 whether the number of empty buffers in the sender's buffer pool exceeds a predetermined threshold. If not, the method 400 ends in step 420. If the number of empty buffers in the sender's buffer pool exceeds the predetermined threshold, the current buffer is released in step 416 and then the method 400 ends in step 420.

The predetermined threshold may be established as desired. The threshold may be a simple integer, or may be a type of algorithm wherein the number of empty buffers that trigger release of a current buffer is related to one or more other system conditions. For example, the threshold may be an algebraic computation based on the amount of data in the partially filled buffer, such that the number of empty buffers needed to trigger release decreases as the amount of data in the partially full buffer increases. The amount of data in the partially full buffer may be based on the number of bytes of data in the buffer, on the number of packets of data in the buffer, or on the percent of the buffer which is full.

Method 400 is preferably implemented in conjunction with some type of time limit. For example, a sender may establish a small time limit during which a partially full buffer will not be released, even if the threshold for the releasing the buffer has been met. The sender may truncate this time limit if the current buffer becomes full, or may truncate a time limit based on any other criteria, as desired. For example, a sender may truncate a time limit based on a particular fraction of the current buffer being full or a particular number of data packets being in the buffer. Preferably, the time limit is implemented such that the partially full buffer is released when the time limit is reached, even if method 400 or method 500 is not running at that point in time.

An advantage of implementing a time limit in conjunction with method 400 is that it increases the effectiveness of outboard IOP algorithms which remove redundant ACKS from buffered sequences of incoming TCP/IP packets. For streaming TCP/IP data through LAN hardware, implementing method 400 with a time limit of one millisecond, for example, significantly improves performance of streaming protocols without significant adverse impact on transaction based protocols.

Figure 5:
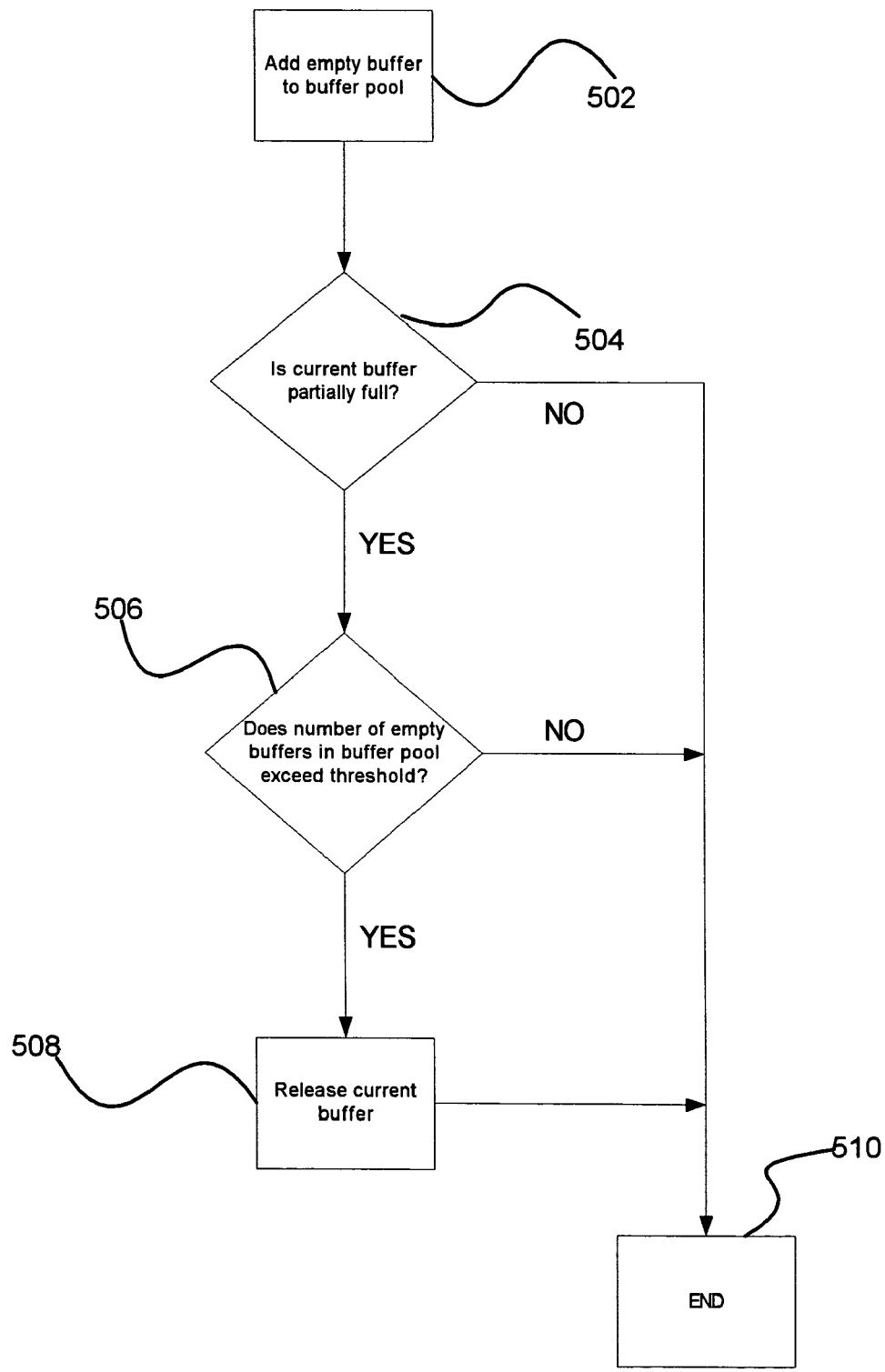
FIG. 5 is a flow diagram of a method wherein a sender of data evaluates whether to release a partially full buffer to a receiver of the data when adding an empty buffer to its buffer pool in accordance with a preferred embodiment of the present invention.

Referring now to FIG. 5, a flow diagram is shown of a method 500 wherein a sender of data evaluates whether to release a partially full buffer to a receiver of the data when adding an empty buffer to its buffer pool, in accordance with a preferred embodiment of the present invention. The method 500 is preferably implemented by a sender each time the sender adds an empty buffer to its buffer pool. As explained above, a sender adds an empty buffer to its buffer pool when an empty buffer is released back to a sender by a receiver. Therefore, method 500 preferably begins in step 502 wherein a sender adds an empty buffer to its buffer pool. Then, the sender in step 504 determines whether the current buffer is partially full. If the current buffer is partially full, the sender in step 506 determines whether the number of empty buffers in the sender's buffer pool exceeds a predetermined threshold. If yes, the sender releases the current buffer in step 508.

Referring again to step 504, if the current buffer is not partially full (i.e. it is empty) the method 500 ends in step 510 and the current buffer is not released to the receiver. Referring again to step 506, if the number of empty buffers in the buffer pool does not exceed the threshold, the current buffer is not released to the receiver and the method 500 ends in step 510. As noted above, the threshold may be any type of threshold and the method 500 is preferably implemented in conjunction with some type of time limit.

Figure 6:
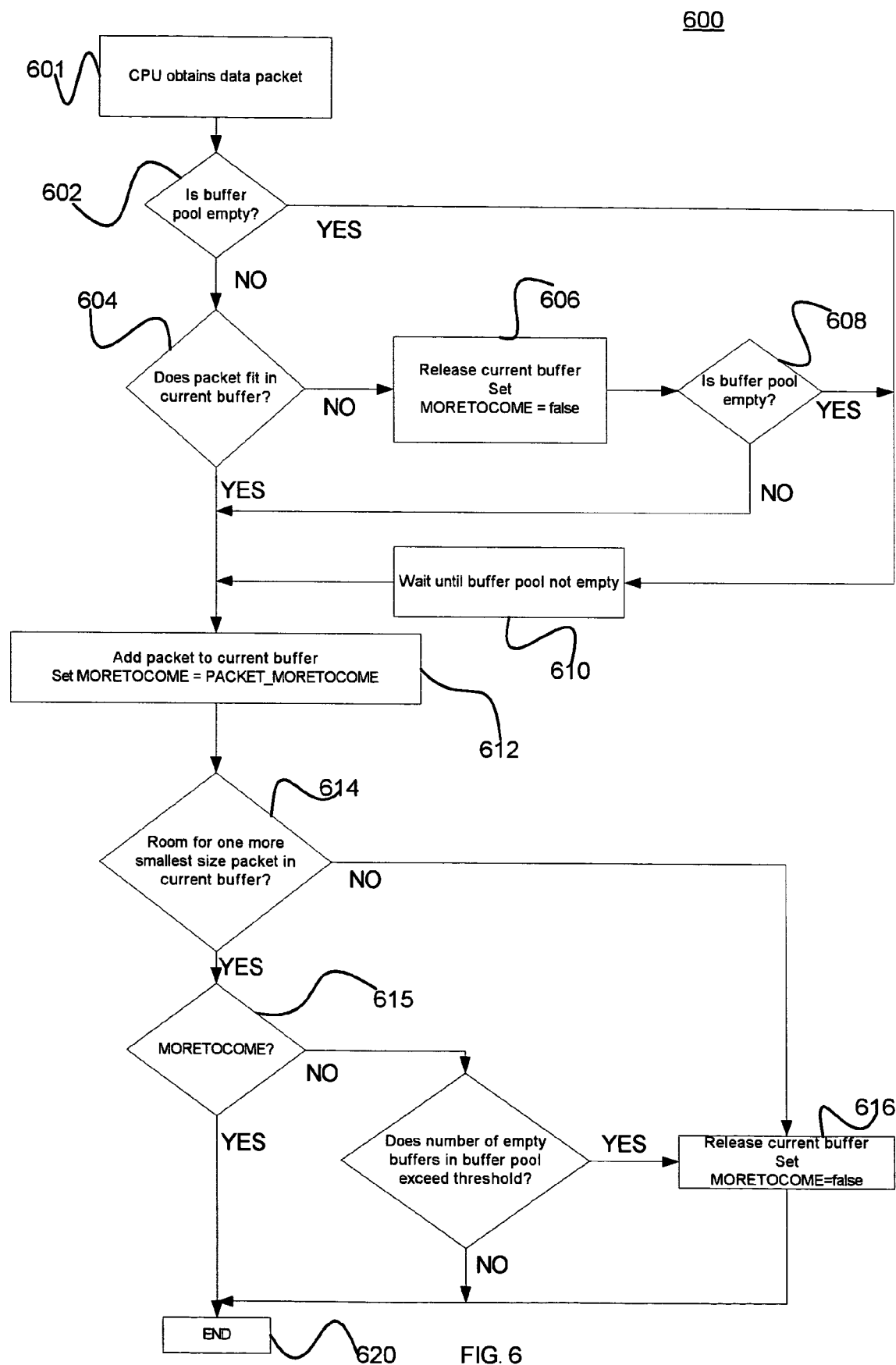
FIG. 6 is a flow diagram of a method wherein a CPU evaluates whether to release a buffer to an IOP when the CPU is adding a data packet to the buffer in accordance with a preferred embodiment of the present invention.
Figure 7:
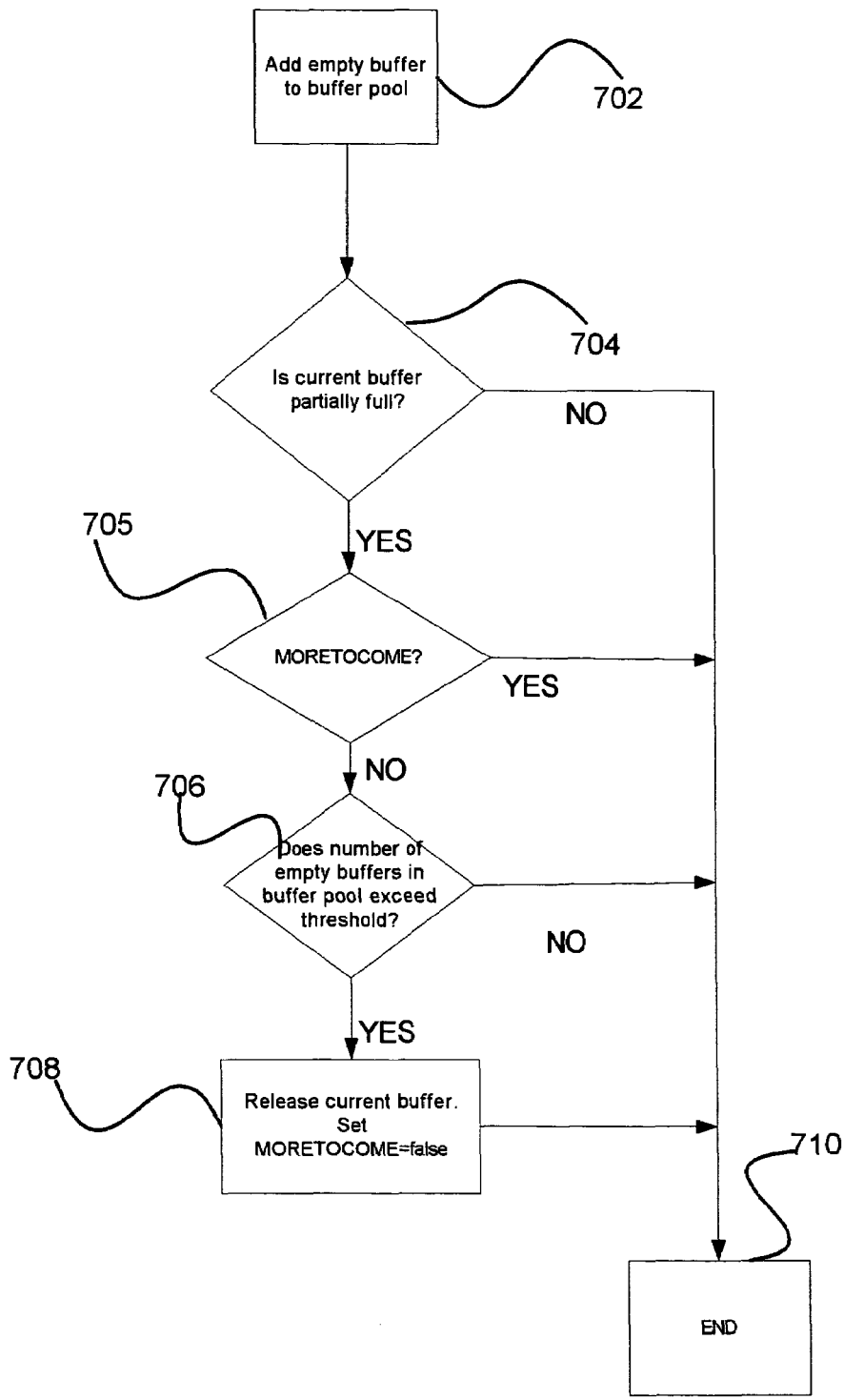
FIG. 7 is a flow diagram of a method wherein a CPU evaluates whether to release a buffer to an IOP when the CPU adds an empty buffer to its buffer pool in accordance with a preferred embodiment of the present invention.

Referring now to FIGS. 6 and 7, a preferred embodiment of the present invention is shown wherein the release of partially full buffers is not only a function of the number of empty buffers in the sender's buffer pool, but also whether the sender has more data packets to send. For outgoing TCP/IP data (i.e. from CPU to IOP), for example, large chunks of data are broken into packets of some maximum size. For each packet, the routine (i.e. software program) which divides the data into data packets can inform the sender (i.e. the CPU in this case) which is placing the data packets into buffers for delivery to an IOP whether the data packet is the last packet in a particular chunk of data. This enables a sender to refrain from releasing a partially full buffer if the packet being added is not the last packet in a particular chunk of data, even where the number of empty buffers indicates that the current buffer should be released. Thus, where a sender is in the process of taking in data packets from a single chunk of data and placing the packets in the current buffer, the sender will not release a partially full buffer even when the number of empty buffers in the sender's buffer pool exceeds the empty buffer threshold or when return of an empty buffer from the receiver causes the number of empty buffers in the sender's buffer pool to exceed the empty buffer threshold.

In this embodiment, a flag is kept for each buffer which indicates when the most recent packet added to the current buffer was not the last data packet in the data chunk to which the data packet belongs. This flag may be implemented in any manner known to those skilled in the art. In one embodiment, a single bit is used wherein the bit is referred to as a more-to-come bit. In the following descriptions, packet_moretocome refers to a flag generated by the routine which divides chunks of data into data packets. This flag will be true when the current data packet is not the last data packet from the chunk currently being divided into packets. Therefore, when the more-to-come bit (i.e. the flag) is set to packet_moretocome, for example, the sender knows that the most recent packet added to a current buffer was not the last data packet in the data chunk to which the packet belongs (i.e. the sender knows that there is at least one more data packet to come). Similarly, when the more-to-come bit is set to false, the sender knows that the most recent data packet added to the current buffer was the last data packet in the chunk and will therefore release the current buffer.

As with the embodiment described in FIGS. 4 and 5 (i.e. methods 400 and 500), this embodiment is also preferably implemented by a sender whenever a packet is added to the current buffer and whenever an empty buffer is released back to the sender from the receiver. Since this embodiment requires knowledge on the part of the sender with respect to whether more data is coming or not, the embodiment is preferably implemented in a CPU where the CPU is the sender and the IOP is the receiver. FIG. 6 describes the embodiment being implemented by a sender CPU when the CPU is placing a data packet into the current buffer. FIG. 7 describes the embodiment being implemented by a sender CPU when the CPU is adding an empty buffer to the CPU's buffer pool.

Referring now to FIG. 6, a flow diagram is shown of a method 600 wherein a CPU evaluates whether to release a buffer to an IOP when the CPU is adding a data packet to the buffer in accordance with a preferred embodiment of the present invention. In this embodiment, the CPU is a sender and the IOP is a receiver. The method 600 is preferably implemented by a CPU each time the CPU, adds a data packet to its current buffer. Method 600 preferably begins in step 601 wherein a CPU obtains a data packet. In step 602 the CPU determines whether its buffer pool is empty. If the CPU's buffer pool is not empty, the CPU checks whether the data packet fits in the current buffer (i.e. the buffer to be or being filled by the CPU) in step 604. If the data packet does not fit in the current buffer, the CPU releases the current buffer to the IOP and sets the more-to-come bit to false in step 606. Once the current buffer is released in step 606, the CPU checks whether the buffer pool is now empty (step 608) as a result of releasing the buffer which previously was the current buffer. If the buffer pool is not empty, the method 600 proceeds to step 612 wherein the data packet is added to the next buffer in line, which is now the current buffer. If in step 608 the buffer pool is empty, the CPU waits until the buffer pool is not empty (i.e. a buffer is released back from a receiver to the sender) in step 610 and then the sender adds the data packet to the current buffer in step 612.

Referring again to step 602, if the buffer pool is empty, the sender waits (step 610) until the buffer pool is not empty and then adds the data packet to the current buffer in step 612. Referring again to step 604, if the data packet does fit in the current buffer, the method 600 proceeds directly to step 612 where the data packet is added to the current buffer. It is noted that in this embodiment when a packet is added to the current buffer in step 612, that the sender also sets the more-to-come bit to packet_moretocome.

Once the data packet has been added to the current buffer and the more-to-come bit has been set as in step 612, the method 600 proceeds to step 614. In step 614, the CPU determines whether there is room for one more smallest-size data packet in the current buffer. This determination may be performed as desired based the smallest data packets exchanged in the system and buffer size, both of which are known to the CPU. If the current buffer cannot hold one more smallest-size packet in the current buffer, the current buffer is released and the more-to-come bit is set to false in step 616 and the method 600 ends in step 620. If there is room for one more smallest-size data packet in the current buffer, the CPU checks the more-to-come bit in step 615 to determine whether there are more data packets on the way belonging to the same data chunk as those data packets already in the current buffer. If there are more data packet(s) coming, the method 600 proceeds to step 620 and ends. If there are no more data packet(s) coming, the CPU determines in step 618 whether the number of empty buffers in the CPU's buffer pool exceeds a predetermined threshold. If no, the method 600 ends in step 620. If yes, the current buffer is released and the more-to-come bit is set to false as in step 616 and then the method 600 ends in step 620.

Referring now to FIG. 7, a flow diagram is shown of a method 700 wherein a CPU evaluates whether to release a partially full buffer to an IOP when the CPU adds an empty buffer to its buffer pool, in accordance with a preferred embodiment of the present invention. In this embodiment, again the CPU is the sender and an IOP is the receiver. The method 700 is preferably implemented by a CPU each time the CPU adds an empty buffer to its buffer pool. As explained previously, a CPU adds an empty buffer to its buffer pool when an empty buffer is released back to the CPU by an IOP. Therefore, method 700 preferably begins in step 702 wherein a CPU adds an empty buffer to its buffer pool. Then, the CPU in step 704 determines whether the current buffer is partially full. If the current buffer is partially full, the CPU in step 705 checks the more-to-come bit to determine whether there are more data packet(s) coming that belong to the data chunk that the last packet already in the current buffer belongs to. If there are more data packet(s) coming, the method 700 ends in step 710. In there are no more data packets coming, the CPU determines in step 706 whether the number of empty buffers in the sender's buffer pool exceeds a predetermined threshold. If yes, the CPU releases the current buffer and sets the more-to-come bit to false in step 708. The method 700 ends in step 710.

Referring again to step 704, if the current buffer is not partially full (i.e. the current buffer is empty), the current buffer is not released to the receiver and the method 700 ends in step 710. Referring again to step 706, if the number of empty buffers in the buffer pool does not exceed the threshold, the current buffer is not released to the receiver and the method 700 ends in step 710.

In methods 600 and 700, like methods 400 and 500, the empty buffer threshold may be any type of threshold (i.e. from simple integer to complex algorithm) and further that methods 600 and 700, like methods 400 and 500 are preferably implemented in conjunction with some sort of time limit, as desired.

The present invention may be implemented in a variety of systems and the various techniques described herein may be implemented in hardware or software, or a combination of both. Furthermore, while the present invention has been described in terms of various embodiments, other variations, which are within the scope of the invention as outlined in the claims below will be apparent to those skilled in the art.

What is claimed is:

1. A method for exchanging data between a central processing unit (CPU) and an input/output processor (IOP), the method comprising the steps of:
   obtaining data packets from a source to send from a CPU to an IOP;
   placing the data packets in a current buffer within a buffer pool belonging to the CPU;
   making a first determination whether there is room for at least one more smallest size data packet in the current buffer;
   releasing the current buffer where the first determination is negative;
   making a second determination whether there is at least one more data packet to come for sending from the CPU to the IOP where the first determination is positive;
   evaluating empty buffers in the buffer pool belonging to the CPU; and
   releasing the current buffer from the CPU to the IOP where the second determination is negative and the evaluation of the empty buffers satisfies a predetermined threshold.

2. The method of claim 1 wherein the CPU releases the current buffer where the number of empty buffers in the buffer pool exceeds a predetermined amount.

3. The method of claim 1 wherein the predetermined threshold is based on the amount of data in the current buffer.

4. The method of claim 1 wherein the predetermined threshold is a number of empty buffers wherein the number needed to trigger release of the current buffer decreases as the amount of data in the current buffer increases.

5. The method of claim 1 wherein the current buffer is released to the receiver after a predetermined amount of time regardless of the evaluation of whether the empty buffers in the buffer pool satisfies the predetermined threshold.

6. A method for exchanging data between a central processing unit (CPU) and an input/output processor (IOP), the method comprising the steps of:
   obtaining an empty buffer at a CPU, the empty buffer being previously released with at least one data packet therein from the CPU to an IOP, back from the IOP;
   placing the empty buffer in a buffer pool belonging to the CPU;
   making a first determination whether a current buffer of the CPU has at least one data packet therein;

making a second determination whether there is at least one more data packet to come for sending from the CPU to the IOP where the first determination is positive;

evaluating empty buffers in the buffer pool belonging to the CPU; and releasing the current buffer from the CPU to the IOP where the second determination is negative and the evaluation of the empty buffers satisfies a predetermined threshold.

7. The method of claim 6 wherein the CPU releases the current buffer where the number of empty buffers in the buffer pool exceeds a predetermined amount.

8. The method of claim 6 wherein the predetermined threshold is based on the amount of data in the current buffer.

9. The method of claim 6 wherein the predetermined threshold is a number of empty buffers wherein the number needed to trigger release of the buffer decreases as the amount of data in the buffer increases.

10. The method of claim 6 wherein the current buffer is released to the receiver after a predetermined amount of time regardless of the evaluation of whether the empty buffers in the buffer pool satisfies the predetermined threshold.

* * * * *